(12) United States Patent
Chae et al.

(10) Patent No.: US 7,483,502 B2
(45) Date of Patent: Jan. 27, 2009

(54) APPARATUS AND METHOD FOR RECEIVING SIGNAL IN MOBILE COMMUNICATION SYSTEM USING ADAPTIVE ANTENNA ARRAY SCHEME

(75) Inventors: Chan-Byoung Chae, Seoul (KR); Katz-Marcos Daniel, Suwon-si (KR); Jung-Min Ro, Seoul (KR); Chang-Ho Suh, Seoul (KR)

(73) Assignee: Samsung Electronics Co., Ltd (KR)

( * ) Notice: Subject to any disclaimer, the term of this patent is extended or adjusted under 35 U.S.C. 154(b) by 756 days.

(21) Appl. No.: 10/922,467

(22) Filed: Aug. 20, 2004

(65) Prior Publication Data
US 2005/0059348 A1   Mar. 17, 2005

(30) Foreign Application Priority Data
Aug. 20, 2003 (KR) ............. 10-2003-0057550

(51) Int. Cl.
*H04L 25/08* (2006.01)
(52) U.S. Cl. ..................................................... 375/346
(58) Field of Classification Search .............. 375/267, 375/285, 340, 342, 346–350; 370/334, 350; 455/63.4, 65, 561, 562.1
See application file for complete search history.

(56) References Cited

U.S. PATENT DOCUMENTS

| | | | | |
|---|---|---|---|---|
| 5,930,243 A | * | 7/1999 | Parish et al. | 370/334 |
| 6,115,409 A | * | 9/2000 | Upadhyay et al. | 375/144 |
| 6,144,711 A | * | 11/2000 | Raleigh et al. | 375/347 |
| 6,369,757 B1 | | 4/2002 | Song et al. | |
| 6,724,841 B2 | * | 4/2004 | Piirainen | 375/346 |
| 7,095,814 B2 | * | 8/2006 | Kyeong et al. | 375/347 |
| 2003/0219085 A1 | * | 11/2003 | Endres et al. | 375/350 |

FOREIGN PATENT DOCUMENTS

EP    1 100 214    5/2001

OTHER PUBLICATIONS

Liberti et al., "Smart Antennas for Wireless Communications: IS-95 and Third Generation CDMA Applications", 1999, pp. 95-97.
Shim et al., "A New Blind Adaptive Algorithm Based on Lagrange's Formula for a Smart Antenna System in CDMA Mobile Communications", 1998 IEEE, pp. 1660-1664.

* cited by examiner

*Primary Examiner*—Khanh C Tran
(74) *Attorney, Agent, or Firm*—The Farrell Law Firm, PC

(57) ABSTRACT

A method for receiving a signal from a radio unit in a base station having at least one reception antenna is disclosed. The method includes receiving a reception signal via the reception antenna, and generating an output signal using the reception signal and a reception beam weight for a previous time; calculating a cost function using a desired reception signal transmitted from the radio unit among the reception signal and the generated output signal; calculating a trace vector using the calculated cost function and the reception signal; updating the reception beam weight using the trace vector for a next time; and generating a reception beam by applying the updated reception beam weight.

24 Claims, 5 Drawing Sheets

APPARATUS AND METHOD FOR RECEIVING SIGNAL IN MOBILE COMMUNICATION SYSTEM USING ADAPTIVE ANTENNA ARRAY SCHEME

PRIORITY

This application claims priority under 35 U.S.C. § 119 to an application entitled "Apparatus and Method for Receiving Signals in a Mobile Communication System Using Adaptive Antenna Array Technology" filed in the Korean Intellectual Property Office on Aug. 20, 2003 and assigned Serial No. 2003-57550, the contents of which are incorporated herein by reference.

BACKGROUND OF THE INVENTION

1. Field of the Invention

The present invention relates generally to an apparatus and method for receiving data in a mobile communication system using an Adaptive Antenna Array (AAA) technology and more particularly to an apparatus and method for receiving data using a reception beam weight generation technique.

2. Description of the Related Art

A next generation mobile communication system is evolving for providing packet service communication systems that transmits burst packet data to a plurality of mobile stations (MSs). The packet service communication systems are suitable for transmission of mass data. Such a packet service communication systems are designed for high-speed packet service. In this regard, the $3^{rd}$ Generation Partnership Project (3GPP), a standardization organization for asynchronous communication technology, has proposed High Speed Downlink Packet Access (HSDPA) to provide the high-speed packet service, while the $3^{rd}$ Generation Partnership Project 2 (3GPP2), a standardization organization for synchronous communication technology, has proposed 1× Evolution Data Only/Voice (1×EV-DO/V) to provide the high-speed packet service.

Both HSDPA and 1×EV-DO/V propose to provide high-speed packet service for smooth transmission of Web/Internet service, and in order to provide the high-speed packet service, a peak throughput as well as an average throughput should be optimized for smooth transmission of packet data as well as circuit data such as voice service data.

In order to support the high-speed transmission of packet data, a communication system employing HSDPA (hereinafter referred to as an "HSDPA communication system") has recently introduced 3 kinds of data transmission techniques: Adaptive Modulation and Coding (AMC), Hybrid Automatic Retransmission Request (HARQ), and Fast Cell Selection (FCS).

The HSDPA communication system increases the data rate using the AMC, HARQ and FCS techniques. Another communication system for increasing the data rate is a system which uses 1×EV-DO/V (hereinafter referred to as a "1×EV-DO/V communication system"). The 1×EV-DO/V communication system also increases a data rate to secure system performance.

Aside from the new techniques such as AMC, HARQ and FCS, there is a another technique which is known as the Multiple Antenna technique which is suitable for coping with the limitation in assigned bandwidth, i.e., increasing the data rate. The Multiple Antenna technique can overcome the limitation of bandwidth resource in a frequency domain because it utilizes a space domain.

The Multiple Antenna technique will be described hereinbelow. A communication system is constructed such that a plurality of mobile stations communicate with each other via a single base station (BS). When the base station performs high-speed data transmission to the one or more mobile stations, a fading phenomenon occurs due to a characteristic of radio channels. In order to overcome the fading phenomenon, a Transmit Antenna Diversity technique (TADt) which is a version of the Multiple Antenna technique, has been proposed.

The TADtis a method for transmitting signals using at least two transmission antennas, i.e., multiple antennas, to minimize a loss of transmission data due to a fading phenomenon, thereby increasing the data rate. The TADt will be described herein below.

Generally, in a wireless channel environment of a mobile communication system, unlike that of hard-wired channel environment, a transmission signal is actually distorted due to several factors such as multipath interference, shadowing, wave attenuation, time-varying noise, interference, etc. Fading caused by multipath interference is closely related to the mobility of a reflector or of a user (or of a mobile station), and is actually, a mixture of a transmission signal and an interference signal which are received at the same time.

Therefore, the received signal suffers from severe distortion during its actual transmission, reducing performance of the entire mobile communication system. The fading may result in distortion of both the amplitude and phase of the received signal, preventing high-speed data communication in the wireless channel environment. Therefore research is being conducted in order to resolve the fading caused by multipath interference.

In conclusion, in order to transmit data at high speed, mobile communication system must minimize a losses due to characteristics of mobile communication channels such as fading, and interference.

In order to prevent unstable communication due to the fading, a diversity technique incorporating multiple antennas is used to implement a Space Diversity technique.

The TADt is popularly used for efficiently resolving the fading phenomenon. The Transmit Antenna Diversity receives a plurality of transmission signals that have experienced independent fading phenomena in a wireless channel environment, thereby coping with distortion caused by the fading. The Transmit Antenna Diversity is classified into Time Diversity, Frequency Diversity, Multipath Diversity, and Space Diversity.

In other words, in order to perform high-speed data communication, a mobile communication system must well cope with the fading phenomenon that severely affects communication performance. The fading phenomenon must be overcome because it reduces amplitude of a received signal from between several dB to tens of dB.

In order to overcome the fading phenomenon, the above diversity techniques are used. For example, Code Division Multiple Access (CDMA) technology adopts a Rake receiver that can achieve diversity performance using delay spread of the channel. The Rake receiver is a type of Receive Diversity technique for receiving multipath signals. However, the Receive Diversity used in the Rake receiver suffers disadvantages because it cannot achieve desired diversity gain when delay spread of the channel is relatively small.

The Time Diversity technique efficiently copes with burst errors occurring in a wireless channel environment using interleaving and coding, and is generally used in a Doppler spread channel. However, the Time Diversity technique can hardly obtain the diversity effects in a low-speed Doppler spread channel.

The Space Diversity technique is generally used in a channel with a low delay spread such as an indoor channel and a pedestrian channel which is a low-speed Doppler spread channel. The Space Diversity technique achieves a diversity gain using at least two antennas. When a signal transmitted via one antenna is attenuated due to fading, a signal transmitted via another antenna is received, thereby acquiring a diversity gain. There are two types of Space Diversity techniques which are commonly used: Receive Antenna Diversity which uses a plurality of reception antennas and Transmit Antenna Diversity which uses a plurality of transmission antennas.

Receive-Adaptive Antenna Array (Rx-AAA) is a subcategory of the Receive Antenna Diversity technique.

In the Rx-AAA technique operates by calculating a scalar product between a signal vector and an appropriate reception beam weight vector of a reception signal received via an antenna array comprised of a plurality of reception antennas. Signals received in a directions desired by a receiver are maximized and a signals received in directions not desired by the receiver are minimized. The "reception beam weight" refers to a weight with which the receiver generates a reception beam in the Rx-AAA technique.

As a result, the Rx-AAA technique amplifies only desired reception signals to their maximum level thereby maintaining a high-quality call and causing an increase in the entire system capacity and service coverage.

Although the Rx-AAA can be applied to both Frequency Division Multiple Access (FDMA) mobile communication systems and Time Division Multiple Access (TDMA) mobile communication systems, it will be assumed herein that the Rx-AAA is applied to communication systems which use CDMA (hereinafter referred to as a "CDMA communication system").

FIG. 1 is a block diagram illustrating a structure of a base station receiver in a conventional CDMA mobile communication system. The base station receiver includes N reception antennas (Rx ANTs) (which include a first reception antenna 111, a second reception antenna 121, . . . , and an $N^{th}$ reception antenna 131); N radio frequency (RF) processors (which include a first RF processor 112, a second RF processor 122, . . . , and an $N^{th}$ RF processor 132, which are mapped to the corresponding reception antennas) respectively; N multipath searchers (which include a first multipath searcher 113, a second multipath searcher 123, . . . , and an $N^{th}$ multipath searcher 133 which are mapped to the corresponding RF processors respectively; L fingers (which include a first finger 140-1, a second finger 140-2, . . . , and an $L^{th}$ finger 140-L), for processing L multipath signals searched by the multipath searchers; a multipath combiner 150 for combining multipath signals output from the L fingers, a deinterleaver 160, and a decoder 170.

Signals transmitted by transmitters in a plurality of mobile stations (MSs) are received at the N reception antennas over a multipath fading radio channel. The first reception antenna 111 outputs the received signal to the first RF processor 112. Each of the RF processors includes an amplifier, a frequency converter, a filter, and an analog-to-digital (A/D) converter, and processes an RF signal.

The first RF processor 112 RF-processes a signal output from the first reception antenna 111 to convert the signal into a baseband digital signal, and outputs the baseband digital signal to the first multipath searcher 113. The first multipath searcher 113 separates L multipath components from a signal output from the first RF processor 112, and the separated L multipath components are output to the first finger 140-1 to the $L^{th}$ finger 140-L, respectively. The first finger 140-1 to the $L^{th}$ finger 140-L, being mapped to the L multiple paths on a one-to-one basis, process the L multipath components.

Because the L multiple paths are considered for each of the signals received via the N reception antennas, signal processing must be performed on N×L signals, and among the N×L signals, signals on the same path are output to the same finger.

Similarly, the second reception antenna 121 outputs the received signal to the second RF processor 122. The second RF processor 122 RF-processes a signal output from the second reception antenna 121 to convert the signal into a baseband digital signal, and outputs the baseband digital signal to the second multipath searcher 123. The second multipath searcher 123 separates L multipath components from a signal output from the second RF processor 122, and the separated L multipath components are output to the first finger 140-1 to the $L^{th}$ finger 140-L, respectively.

In the same manner, the $N^{th}$ reception antenna 131 outputs the received signal to the $N^{th}$ RF processor 132. The $N^{th}$ RF processor 132 RF-processes a signal output from the $N^{th}$ reception antenna 131 to convert the signal into a baseband digital signal, and outputs the baseband digital signal to the $N^{th}$ multipath searcher 133. The $N^{th}$ multipath searcher 133 separates L multipath components from a signal output from the $N^{th}$ RF processor 132, and the separated L multipath components are output to the first finger 140-1 to the $L^{th}$ finger 140-L, respectively.

In this way, among the L multipath signals for the signals received via the N reception antennas, the same multipath signals are input to the same fingers. For example, first multipath signals from the first reception antenna 111 to the $N^{th}$ reception antenna 131 are input to the first finger 140-1. In the same manner, the $L^{th}$ multipath signals from the first reception antenna 111 to the $N^{th}$ reception antenna 131 are input to the $L^{th}$ finger 140-L. The first finger 140-1 to the $L^{th}$ finger 140-L are different only in signals input thereto and output therefrom, and are identical in structure and operation. Therefore, only the first finger 140-1 will be described herein for simplicity.

The first finger 140-1 is comprised of N despreaders of a first despreader 141, a second despreader 142, . . . , and an $N^{th}$ despreader 143, being mapped to the N multipath searchers, a signal processor 144 for calculating a reception beam weight vector for generating a reception beam using signals received from the N despreaders, and a reception beam generator 145 for generating a reception beam using the reception beam weight vector calculated by the signal processor 144.

A first multipath signal output from the first multipath searcher 113 is input to the first despreader 141. The first despreader 141 despreads the first multipath signal output from the first multipath searcher 113 with a predetermined spreading code, and outputs the despread multipath signal to the signal processor 144 and the reception beam generator 145. Here, the despreading process is called "temporal processing."

Similarly, a first multipath signal output from the second multipath searcher 123 is input to the second despreader 142. The second despreader 142 despreads the first multipath signal output from the second multipath searcher 123 with a predetermined spreading code, and outputs the despread multipath signal to the signal processor 144 and the reception beam generator 145. In the same way, a first multipath signal output from the $N^{th}$ multipath searcher 133 is input to the $N^{th}$ despreader 143. The $N^{th}$ despreader 143 despreads the first multipath signal output from the $N^{th}$ multipath searcher 133 with a predetermined spreading code, and outputs the despread multipath signal to the signal processor 144 and the reception beam generator 145.

The signal processor 144 receives the signals output from the first despreader 141 to the $N^{th}$ despreader 143, and calculates a reception beam weight set $\underline{w}_k$ for generation of a reception beam. Here, a set of first multipath signals output from the first multipath searcher 113 to the $N^{th}$ multipath searcher 133 will be defined as "$\underline{x}_k$." The first multipath signal set $\underline{x}_k$ represents a set of first multipath signals received via the first reception antenna 111 to the $N^{th}$ reception antenna 131 at a $k^{th}$ point, and the first multipath signals constituting the first multipath signal set $\underline{x}_k$ are all vector signals. The reception beam weight set $\underline{w}_k$ represents a set of reception beam weights to be applied to the first multipath signals received via the first reception antenna 111 to the $N^{th}$ reception antenna 131 at the $k^{th\ point}$, and the reception beam weights constituting the weight set $\underline{w}_k$ are all vector signals.

A set of signals determined by despreading all of the first multipath signals in the first multipath signal set $\underline{x}_k$ will be defined as $\underline{y}_k$. The despread signal set $\underline{y}_k$ of the first multipath signals represents a set of signals determined by despreading the first multipath signals received via the first reception antenna 111 to the $N^{th}$ reception antenna 131 at the $k^{th}$ point, and the despread signals constituting the despread signal set $\underline{y}_k$ of the first multipath signals are all vector signals. For the convenience of explanation, the term "set" will be omitted, and the underlined parameters represent sets of corresponding elements.

Each of the first despreaders 141 to the $N^{th}$ despreaders 143 despreads the first multipath signal $\underline{x}_k$ with a predetermined despreading code, so that the reception power of a desired reception signal is higher than the reception power of an interference signal by a process gain. Here, the despreading code is identical to the spreading code used in transmitters of the mobile stations.

As described above, the despread signal $\underline{y}_k$ of the first multipath signal $\underline{x}_k$ is input to the signal processor 144. The signal processor 144 calculates a reception beam weight with the despread signal $\underline{y}_k$ of the first multipath signal $\underline{x}_k$, and outputs the reception beam weight $\underline{w}_k$ to the reception beam generator 145. As a result, the signal processor 144 calculates the reception beam weight $\underline{w}_k$ including a total of N reception beam weight vectors applied to the first multipath signal $\underline{x}_k$ output from the first reception antenna 111 to the $N^{th}$ reception antenna 131, with the despread signals $\underline{y}_k$ of a total of N first multipath signals output from the first reception antenna 111 to the $N^{th}$ reception antenna 131. The reception beam generator 145 receives the despread signals $\underline{y}_k$ of a total of the N first multipath signals $\underline{x}_k$ and a total of the N weight vectors $\underline{w}_k$. The reception beam generator 145 generates a reception beam with a total of the N reception beam weight vectors $\underline{w}_k$, calculates a scalar product of the despread signal $\underline{y}_k$ of the first multipath signal $\underline{x}_k$ and the reception beam weight $\underline{w}_k$ corresponding to the reception beam, and outputs the result as an output $z_k$ of the first finger 140-1. The output $z_k$ of the first finger 140-1 can be expressed as Equation (1):

$$z_k = \underline{w}_k^H \underline{y}_k \quad (1)$$

In Equation (1), H denotes a Hermitian operator, i.e. a conjugate-transpose. A set $\underline{z}_k$ of output signals $z_k$ from L fingers in the base station receiver is finally input to the multipath combiner 150.

Although only the first finger 140-1 has been described, the other fingers operate equivalently to the first finger 140-1 in operation. Therefore, the multipath combiner 150 combines the signals output from the first finger 140-1 to the $L^{th}$ finger 140-L, and outputs the combined signal to the deinterleaver 160. The deinterleaver 160 deinterleaves the signal output from the multipath combiner 150 in a deinterleaving method corresponding to the interleaving method used in the transmitter, and outputs the deinterleaved signal to the decoder 170. The decoder 170 decodes the signal output from the deinterleaver 160 in a decoding method corresponding to the encoding method used in the transmitter, and outputs the decoded signal as final reception data.

The signal processor 144 calculates a reception beam weight $\underline{w}_k$ such that a Mean Square Error (MSE) of a signal received from a mobile station transmitter, desired to be received by a predetermined algorithm, is minimized. The reception beam generator 145 generates a reception beam using the reception beam weight $\underline{w}_k$ generated by the signal processor 144. The process of generating a reception beam so that MSE is minimized is called "spatial processing."

Therefore, when Rx-AAA is used in a CDMA mobile communication system, temporal processing and spatial processing are simultaneously performed. The operation of simultaneously performing temporal processing and spatial processing is called "spatial-temporal processing."

The signal processor 144 receives multipath signals despread for each finger in the above-stated manner, and calculates a reception beam weight capable of maximizing a gain of the Rx-AAA according to a predetermined algorithm. The signal processor 144 operates to minimize the MSE.

Reception beam weight calculation algorithms for adaptively minimizing the MSE, are algorithms for reducing errors on the basis of a reference signal, and support the Constant Modulus (CM) and the Decision-Directed (DD) techniques as a blind technique, when there are no reference signals.

The signal processor 144 calculates a reception beam weight capable of maximizing a gain of the Rx-AAA technique according to a predetermined algorithm by receiving multipath signals after despreading for an individual finger as described above. Algorithms for calculating a reception beam weight capable of maximizing the gain of the Rx-AAA technique, include a Maximum Signal to Noise Ratio (Max SNR) technique and a Least Mean Square (LMS) technique.

1) Max SNR

Max SNR is an algorithm for maximizing output power of a received signal. In Max SNR, output power is calculated according to Equation (2):

$$P = E[zz^H] \quad (2)$$
$$= \underline{w}^H R \underline{w}$$

where $R = E[\underline{y}\underline{y}^H]$. As illustrated in FIG. 1, 'z' denotes a value after despreading, to which a weight vector is applied, and 'y' denotes a value given before it is multiplied by the weight vector.

In this case, Max SNR can be expressed as Equation (3):

$$\max \frac{\underline{w} R \underline{w}}{\underline{w}^H \underline{w}}, \text{ subject to } \underline{w}^H \underline{w} = 1 \quad (3)$$

An operation process of calculating the weight is defined as
1. Estimate $\underline{w}_0, \underline{r}_0, \underline{v}_0$
2. k=k+1
   a. $R = f^* R + \underline{x}(k) \cdot \underline{x}^H(k)$ <$N^2+N$>
   b. $\lambda = \underline{w}^H(k) R \underline{w}(k)$ <$N^2+N$>
   c. $\underline{r}(k) = \lambda \underline{w}(k) - R \underline{w}(k)$ <N> d. $\underline{q}(k)=\|\underline{r}(k)\|^2/\|\underline{r}(k-1)\|^2$ <N>
e. $\underline{v}(k)=\underline{r}(k)+\underline{q}(k)\underline{v}(k-1)$ <N>
f. $a=\underline{w}^H(k)R\underline{v}(k)$ <$N^2$+N>
   $\beta=\underline{v}^H(k)R\underline{v}(k)$ <$N^2$+N>
   $\gamma=\underline{w}^H(k)\underline{v}(k)$ <N>
   $\delta=\underline{v}^H(k)\underline{v}(k)$ <N>
   $a=\beta\gamma-\delta\alpha$
   $b=\beta-\lambda\delta$
   $c=\alpha-\lambda\gamma$
   $t(k)=[-b+(b^2-4ac)^{1/2}]/2a$
g. $\underline{w}(k+1)=\underline{w}(k)+t(n)\underline{v}(n)$ <N>
h. Normalize $\underline{w}(k+1)$ <1.5N>

3. Iterate step 2 for a new snapshot

In this process, < > means the number of calculations, and it can be understood that in Max SNR, the total number of calculations is $O(4N^2+11.5N)$. That is, the number of calculations is in proportion to $O(4N^2+11.5N)$. Here, 'O' means 'order', and a value N means one complex calculation. For each complex calculation, calculation for real parts or imaginary parts are performed four times. That is, complex calculation of (a+jb)(c+jd) is achieved by four multiplications of ac, ad, bc, and bd.

2) LMS (Least Mean Square)

LMS (Least Mean Square) uses a gradual update technique so that a cost function calculated on the basis of the MSE is minimized. Such an algorithm is superior in performance, but inferior in implementation due to a great number of calculations. That is, like in Max SNRmany (i.e., $O(4N^2+11.5N)$) calculations are performed for each complex calculation, causing an increase in the hardware complexity of the reception apparatus.

SUMMARY OF THE INVENTION

It is, therefore, an object of the present invention to provide an apparatus and method for receiving data using Adaptive Antenna Array technology in a mobile communication system.

It is another object of the present invention to provide an apparatus and method for receiving data using a reception beam weight generation technique in a mobile communication system employing Adaptive Antenna Array technology.

It is further another object of the present invention to provide an apparatus and method for calculating a reception beam weight using a simplified gradient method (SGM) capable of reducing the number of calculations in a mobile communication system employing Adaptive Antenna Array technology.

In accordance with a first aspect of the present invention, there is provided a method for receiving a signal from a radio unit in a base station having at least one reception antenna. The method includes receiving a reception signal via the reception antenna, and generating an output signal using the reception signal and a reception beam weight for a previous time; calculating a cost function using a desired reception signal transmitted from the radio unit among the reception signal and the generated output signal; calculating a trace vector using the calculated cost function and the reception signal; updating the reception beam weight using the trace vector for a next time; and generating a reception beam by applying the updated reception beam weight.

In accordance with a second aspect of the present invention, there is provided a method for receiving a signal from a radio unit in a base station having at least one reception antenna. The method includes despreading a reception signal received at the base station, and outputting the despread signal; generating an output signal of fingers using the despread signal and a reception beam weight for a previous time; calculating a cost function using a desired reception signal transmitted from the radio unit among the received signal and the generated output signal of the fingers; calculating a trace vector using the calculated cost function and the despread signal; updating the reception beam weight using the trace vector for a next time; and generating a reception beam by applying the updated reception beam weight using the reception beam weight.

In accordance with a third aspect of the present invention, there is provided a method for calculating a reception beam weight for a radio unit capable of reducing the number of calculations in a base station that has at least one reception antenna, generates a reception beam of the reception antenna using a previous reception beam weight and receiving a signal for a current reception signal, generating an output signal using the received signal by applying the generated reception beam, and calculating a current reception beam weight using the output signal. The method includes generating a cost function by applying the generated output signal and a desired reception signal transmitted from the radio unit among the received signal; and calculating a reception beam weight for a current time by performing predetermined calculations using the received signal, the generated cost function, and the previous reception beam weight.

In accordance with a fourth aspect of the present invention, there is provided an apparatus for receiving a signal from a radio unit in a base station having at least one reception antenna. The apparatus includes a signal processor for receiving a reception signal via the reception antenna, calculating a cost function using a desired reception signal transmitted from the radio unit among the received signal and an output signal generated by a previous reception beam weight, and calculating a reception beam weight using the cost function; and a reception beam generator for generating a reception beam using the reception signal and the calculated reception beam weight.

In accordance with a fifth aspect of the present invention, there is provided an apparatus for receiving a signal from a radio unit in a base station having at least one antenna. The apparatus includes a despreader for receiving a signal, and generating a despread signal by despreading the received signal; a signal processor for calculating a cost function using a desired reception signal transmitted from the radio unit among the received signal and an output signal generated by a previous reception beam weight, and calculating a reception beam weight using the cost function; and a reception beam generator for generating a reception beam using the despread signal and the calculated reception beam weight.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
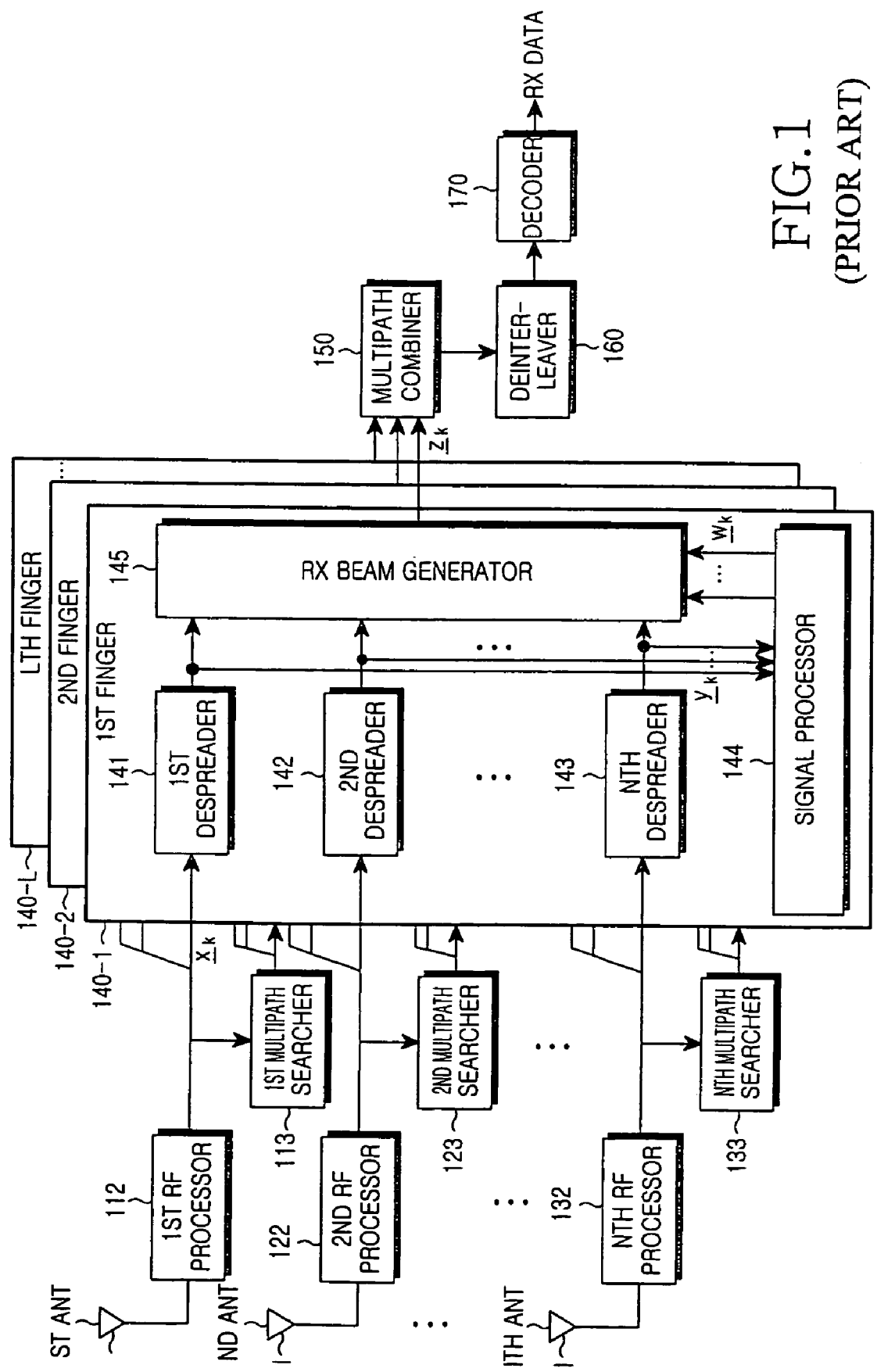
FIG. 1 is a block diagram illustrating a structure of a base station receiver in a CDMA mobile communication system employing multiple antennas.

A preferred embodiment of the present invention will now be described in detail with reference to the annexed drawings. In the following description, a detailed description of known functions and configurations incorporated herein has been omitted for conciseness.

Before a description of the present invention is given, a model of a reception signal received at a receiver of a base station (BS) will be considered. It will be assumed that a receiver of the base station includes a receive-antenna array having a plurality of reception antennas (Rx ANTs), and the receive-antenna array is generally mounted only in the receiver of the base station considering its cost and size, and is not mounted in a receiver of a mobile station (MS). That is, it is assumed that the receiver of the mobile station includes only one reception antenna. However, for example, in a Multi Input Multi Output (MIMO) system supporting a mobile station including a plurality of antennas, the mobile station receiver can also be identical in structure to a bases station receiver described below. Although the present invention can be applied to all of mobile communication systems using Frequency Division Multiple Access (FDMA), Time Division Multiple Access (TDMA), Code Division Multiple Access (CDMA) and Orthogonal Frequency Division Multiplexing (OFDM), the present invention will be described with reference to a mobile communication system using OFDM (hereinafter referred to as an "OFDM mobile communication system").

A signal transmitted from a transmitter of an $m^{th}$ mobile station existing in a cell serviced by the base station is expressed as Equation (4):

$$s_m(t) = \sqrt{p_m} b_m(t) c_m(t) \quad (4)$$

In Equation (4), $s_m(t)$ denotes a transmission signal of an $m^{th}$ mobile station, $p_m$ denotes transmission power of the $m^{th}$ mobile station, $b_m(t)$ denotes a user information bit sequence of the $m^{th}$ mobile station, and $c_m(t)$ denotes a user spreading code sequence of the $m^{th}$ mobile station, having a chip period of $T_c$.

The transmission signal transmitted from the mobile station transmitter is received at a receiver of the base station over a multipath vector channel. It is assumed that channel parameters of the multipath vector channel are changed at relatively low speed, compared with the bit period $T_b$. Therefore, it is assumed that the channel parameters of the multipath vector channel are constant for certain bit periods. A complex baseband reception signal for a first multipath of an $m^{th}$ mobile station, received at a receiver of the base station, is expressed by Equation (5). It should be noted that the reception signal of Equation (5) represents a baseband signal determined by down-converting a radio frequency (RF) signal received at the base station receiver.

$$\underline{x}_{ml}(t) = \alpha_{ml} e^{j\phi_{ml}} b_m(t-\tau_{ml}) c_m(t-\tau_{ml}) \underline{a}_{ml} \quad (5)$$

In Equation (5), $\underline{x}_{ml}$ denotes a set of complex baseband reception signals received through a first multipath of the $m^{th}$ mobile station, $\alpha_{ml}$ denotes a fading attenuation applied to the first multipath of the $m^{th}$ mobile station, $\phi_{ml}$ denotes a phase transition applied to the first multipath of the $m^{th}$ mobile station, $\tau_{ml}$ denotes a time delay applied to the first multipath of the $m^{th}$ mobile station, and $\underline{a}_{ml}$ denotes a set of array responses (ARs) applied to the first multipath of the $m^{th}$ mobile station. Because the base station receiver includes a plurality of, for example, N reception antennas, a signal transmitted by the $m^{th}$ mobile station is received at the base station receiver via the N reception antennas. Therefore, the number of signals received via the first multipath is N, and N complex baseband reception signals received via the first multipath of the $m^{th}$ mobile station constitute a set of the reception signals. Here, for the convenience of explanation, the term "set" will be omitted, and the underlined parameters represent sets of corresponding elements.

When a current linear antenna array is used, the array response $\underline{a}_{ml}$ is defined as Equation (6):

$$\underline{a}_{ml} = \begin{bmatrix} 1 & e^{j2\pi \frac{d}{\lambda} \sin\theta_{ml}} & \cdots & e^{j2\pi \frac{d}{\lambda}(N-1)\sin\theta_{ml}} \end{bmatrix}^T \quad (6)$$

In Equation (6), 'd' denotes a distance between separated reception antennas, $\lambda$ denotes a wavelength at a frequency band in use, N denotes the number of the reception antennas, and $\theta_{ml}$ denotes direction-of-arrival (DOA) applied to the first multipath of the $m^{th}$ mobile station.

If it is assumed that the number of mobile stations existing in a cell serviced by the base station is M and there are L multiple paths for each of the M mobile stations, a reception signal received at the base station becomes the sum of transmission signals transmitted from the M mobile stations and additive white Gaussian noises (AWGN), as represented by Equation (7):

$$\underline{x}(t) = \sum_{m=1}^{M} \sum_{l=1}^{L} \underline{x}_{ml}(t) + \underline{n}(t) \quad (7)$$

In Equation (7), $\underline{n}(t)$ denotes a set of the additive white Gaussian noises added to the transmission signals transmitted from the M mobile stations.

It is assumed that a signal the base station desires to receive in the reception signal of Equation (7) is $\underline{x}_{11}$. The $\underline{x}_{11}$ represents a signal a first mobile station has transmitted via a first multipath. Because it is assumed that a signal the base station desires to receive is $\underline{x}_{11}$, all signals except the signal $\underline{x}_{11}$ are regarded as interference signals and noises. Thus, Equation (7) can be rewritten as Equation (8):

$$\underline{x}(t) = \alpha_{11} e^{j\phi_{11}} b_1(t-\tau_{11}) c_1(t-\tau_{11}) \underline{a}_{11} + \underline{i}(t) + \underline{n}(t) \quad (8)$$

In Equation (8), $\underline{i}(t)$ denotes an interference signal, which is defined as Equation (9):

$$\underline{i}(t) = \sum_{l=2}^{L} \underline{x}_{1l}(t) + \sum_{m=2}^{M} \sum_{l=1}^{L} \underline{x}_{ml}(t) \quad (9)$$

The first term of Equation (9) is a transmission signal of a mobile station that the base station desires to receive, but represents the inter-path interference (IPI) by other multiple paths that the base station does not desire to receive. The second term of Equation (9) represents the multiple access interference (MAI) by other mobile stations.

Further, the $\underline{x}$(t) is despread with a despreading code $c_1$(t−$\tau_{11}$) previously set in a first finger (l=1) for a corresponding multipath in a corresponding channel card of the base station receiver, i.e. a channel card (m=1) assigned to the first mobile station, and the despread signal $\underline{y}$(t) is defined in Equation (10). The despreading code $c_1$(t−$\tau_{11}$) is identical to the despreading code $c_1$(t−$\tau_{11}$) used in a base station transmitter during signal transmission.

The base station includes a plurality of receivers described in conjunction with FIG. 1, each of the receivers is called a "channel card," and one channel card is assigned to one mobile station. As described in connection with FIG. 1, the channel card includes as many fingers as the number of multiple paths, and the fingers are mapped to corresponding multipath signals on a one-to-one basis.

$$\underline{y}(k) = \int_{(k-1)T_b+\tau_{11}}^{kT_b+\tau_{11}} x(t)c_1^*(t-\tau_{11})dt \quad (10)$$

In Equation (10), 'k' denotes a $k^{th}$ sampling point.

When the signal $\underline{y}$(t) after despreading is generated by despreading the pre-despread signal $\underline{x}$(t) with the despreading code $c_1$(t−$\tau_{11}$), the power of a signal component which the base station receiver desires to receive from among the reception signals is amplified by a gain G according to a characteristic of a despreader. It is noted that although the power of a signal component the base station receiver desires to receive is amplified by a process gain G, the power of the signal components the base station receiver does not desire to receive is not changed at all. Therefore, a correlation matrix between a reception signal before despreading and a reception signal after despreading can be calculated.

In order to calculate the correlation matrix between a reception signal before despreading and a reception signal after despreading, the reception signal $\underline{x}$(t) before despreading is sampled at a $k^{th}$ point which is equal to the sampling point of the reception signal $\underline{y}$(t) after despreading. The signal obtained by sampling the reception signal $\underline{x}$(t) before despreading at the $k^{th}$ point is represented by Equation (11):

$$\underline{x}(k) = \alpha_{11}e^{j\phi 11}b_{1k}c_{1k}\underline{a}_{11} + \underline{i}_k + \underline{n}_k \quad (11)$$

In conclusion, in order to calculate a correlation matrix between a reception signal $\underline{x}$(t) before despreading and a reception signal $\underline{y}$(t) after despreading, it is assumed that the signal of Equation (11) is acquired by sampling the reception signal $\underline{x}$(t) before despreading at the $k^{th}$ point which is equal to the sampling point of the reception signal $\underline{y}$(t) after despreading, and that the reception signal $\underline{x}$(t) before despreading and the reception signal $\underline{y}$(t) after despreading are stationary.

A description will now be made of a simplified gradient method (SGM) proposed in the present invention.

A set of reception signals before despreading, including complex reception signals received via N reception antennas at a particular time, i.e. complex reception signals $x_1$ to $x_N$ received via a first reception antenna to an $N^{th}$ reception antenna, will be defined as $\underline{x}=[x_1,x_2,\ldots,x_N]^T$. Here, 'T' is an operator representing a transpose operation.

Additionally, a set of reception signals after despreading the complex reception signals $x_1, x_2, \ldots, x_N$ received via the N reception antennas will be defined as $\underline{y}=[y_1,y_2,\ldots,y_N]^T$ The reception signal $\underline{y}$ after despreading is determined by the sum of a signal component $\underline{s}$ the base station receiver desires to receive and a signal component $\underline{u}$ the base station receiver does not desire to receive, as represented by Equation (12):

$$\underline{y}=\underline{s}+\underline{u} \quad (12)$$

A set of complex reception beam weights to be multiplied by the complex reception signals $x_1,x_2,\ldots,x_N$ received via the N reception antennas, i.e., complex reception beam weights $w_1$ to $w_N$ to be multiplied by complex reception signals $x_1$ to $x_N$ received via the first reception antenna to the $N^{th}$ reception antenna, will be defined as $\underline{w}=[w_1,w_2,\ldots,w_N]^T$. Wherein, 'T' is an operator which represents a transpose operation.

An output signal $\underline{z}$ from fingers in a particular user card, i.e., a channel card assigned to a particular mobile station, is determined by calculating a scalar product of the reception beam weight $\underline{w}$ and the reception signal $\underline{y}$ after despreading, as represented by Equation (13):

$$z = \underline{w}^H\underline{y} = \sum_{i=1}^{N} w_i^* y_i \quad (13)$$

In Equation (13), 'i' denotes the number of reception antennas.

The output signal $\underline{z}$ can be classified into a signal component $\underline{w}^H\underline{s}$ the base station receiver desires to receive, and a signal component $\underline{w}^H\underline{u}$ the base station receiver does not desire to receive, using Equation (12) and Equation (13).

As described above, the reception signal $\underline{y}$ in Equation (13) is expressed as a basic reception signal of an antenna array, as defined below in Equation (14):

$$\underline{y}(t) = \sum_{k=1}^{M} s_k(t)\underline{a}(\theta_k) + \underline{n}(t) \quad (14)$$

A received signal vector $\underline{y}$(t), a steering vector $\underline{a}(\theta_k)$, and an impinging signal vector $\underline{s}$(t) in Equation (14) can be expressed as set forth in the following Equations (15) through (17):

$$\underline{y}(t)=[y_0(t),y_1(t),\ldots,y_{N-1}(t)]^T \quad (15)$$

$$\underline{a}(\theta_k)=[1e^{-j\pi \sin \theta_k} \ldots e^{-j(N-1)\pi \sin \theta_k}]^T \quad (16)$$

$$\underline{s}(t)=[s_1(t)s_2(t)\ldots s_M(t)]^T \quad (17)$$

Further, $\underline{n}$(t) in Equation (14) denotes additive white Gaussian noises (AWGN).

Power of a signal $s_1$(t) desired to be received in a CDMA environment is much higher than power of other signals experiencing interference. Therefore, the reception signal $y_1$(t) can be approximately expressed as Equation (18):

$$y_1(t)=s_1(t)\underline{a}(\theta_1) \quad (18)$$

In order to apply the simplified gradient method according to the present invention, the reception signal of Equation (18) is simplified by ignoring interferences of undesired reception signals which are relatively low in power. In addition, for simplicity of calculation, Rayleigh fading is also ignored.

If Equation (18) is substituted in Equation (13), then Equation (19) is derived:

$$z=\underline{w}^H\underline{a}(\theta_1)s_1(t) \quad (19)$$

In Equation (19), a weight vector $\underline{w}$ is approximate to $\underline{a}(\theta_1)$, as set forth in Equation (20):

$$\underline{w}\approx\underline{a}(\theta_1) \quad (20)$$

Therefore, Equation (19) can be simplified into Equation (21):

$$\underline{z} = Ns_1(t) \quad (21)$$

In Equation (21), because the desired reception signal $s_1(t)$ is approximate to $\underline{y}_1(t)$, the following relation is given in Equation (22):

$$\frac{z}{y_1} - N = 0 \quad (22)$$

A cost function J used in the simplified gradient method according to the present invention can be determined using Equation (22), to result in Equation (23):

$$J = (z/y_1 - N)^2 \quad (23)$$

The simplified gradient method proposed in the present invention calculates an optimal reception beam weight vector in accordance with Equation (23) considering only a desired reception signal from a mobile station. Therefore, differentiation is performed in accordance with Equation (24) to find a value for minimizing the cost function of Equation (23).

In Equation (23), because the cost function J has a type of a second-order convex function, the cost function J must be differentiated such that the resultant value becomes 0, in order to minimize the cost function J. A differentiated value of the cost function J can be defined as Equation (24):

$$\nabla_k = \frac{\partial J}{\partial \underline{w}} = (z/y_1 - N)\underline{y}/y_1 \quad (24)$$

However, it is difficult to acquire an optimal reception beam weight $\underline{w}^{opt}$ with a single processing process in an actual channel environment, and because the reception signal $\underline{y}$ after despreading is input at each point, a recursive formula of Equation (25) should be used in order to adaptively or recursively acquire the optimal reception beam weight $\underline{w}^{opt}$.

$$\underline{w}_{k+1} = \underline{w}_k - \mu \nabla_k \quad (25)$$

In Equation (25), 'k' denotes a $k^{th}$ point, $\underline{w}_k$ denotes a reception beam weight at the $k^{th}$ point, $\mu$ denotes a constant gain, and $\nabla_k$ denotes a trace vector at the $k^{th}$ point. The trace vector $\nabla_k$ at the $k^{th}$ point represents a vector for converging a differentiated value of the cost function J to a minimum value, for example, 0.

That is, Equation (25) illustrates a process of updating a value generated before or after a constant gain $\mu$ from the reception beam given weight $\underline{w}_k$ to be used at a current point in a direction of the trace vector $\nabla_k$ as a reception beam weight $\underline{w}_{k+1}$ to be used at the next point.

A description will now be made of a structure of a base station receiver for calculating a weight vector and generating a reception beam in the simplified gradient method according to an embodiment of the present invention.

Figure 2:
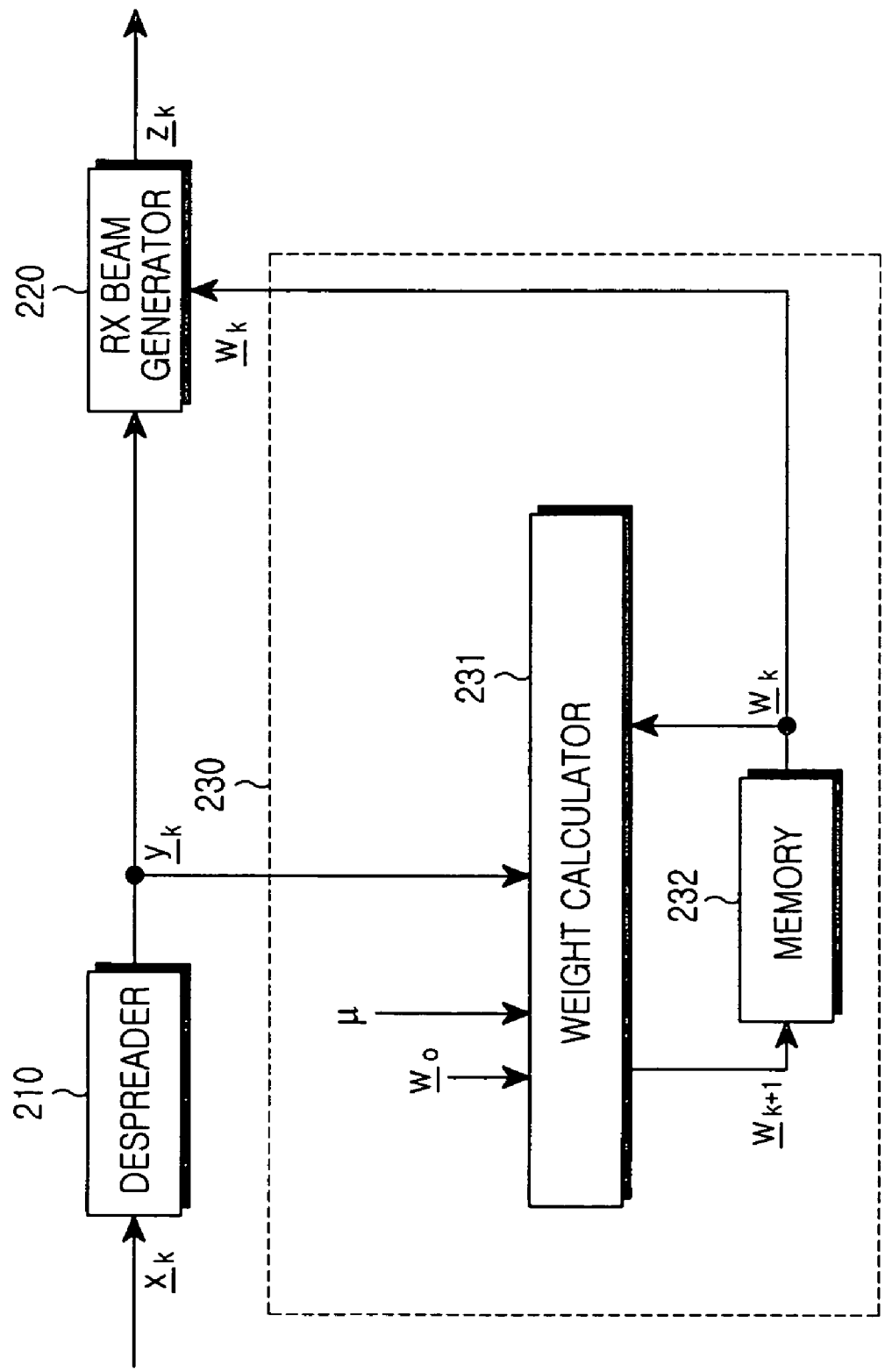
FIG. 2 is a block diagram illustrating a structure of a base station receiver according to an embodiment of the present invention.

FIG. 2 is a block diagram illustrating a structure of a base station receiver according to an embodiment of the present invention. Tt should be noted that a base station receiver according to this embodiment of the present invention is applied to the base station receiver described in connection with FIG. 1. For simplicity, only the elements directly related to the present invention in the base station receiver will be described with reference to FIG. 2. Additionally, this embodiment of the present invention is applied to a base station receiver supporting the Max SNR technique.

Referring to FIG. 2, when a reception signal $\underline{x}_k$ at a point k is received, a despreader 210 despreads the reception signal $\underline{x}_k$ using a predetermined despreading code, and outputs the despread reception signal $\underline{y}_k$ to a signal processor 230 and a reception beam generator 220. The signal processor 230 includes a reception beam weight calculator 231 and a memory 232.

For simplicity, FIG. 2 will be described with reference to only the first finger 140-1 in the base station receiver of FIG. 1. Therefore, the despreader 210 of FIG. 2 is substantially identical in operation to the N despreaders of FIG. 1 (i.e., the first despreader 141, the second despreader 142 . . . the $N^{th}$ despreader 143 in the first finger 140-1).

The reception beam weight calculator 231 in the signal processor 230 receives an error value $e_k$ and the despread reception signal $\underline{y}_k$, calculates a reception beam weight $\underline{w}_k$ using a predetermined constant gain $\mu$ and an initial reception beam weight $\underline{w}_0$, and outputs the calculated reception beam weight $\underline{w}_k$ to the memory 232.

Herein, the reception beam weight calculator 231 calculates the reception beam weight $\underline{w}_k$ in the simplified gradient method according to the present invention. That is, the reception beam weight calculator 231 calculates the reception beam weight $\underline{w}_k$ using Equation (24) and Equation (25).

The memory 232 buffers the reception beam weight $\underline{w}_k$ calculated by the reception beam weight calculator 231, and the reception beam weight calculator 231 uses the reception beam weight $\underline{w}_k$ stored in the memory 232 when updating the reception beam weight $\underline{w}_k$. That is, the reception beam weight calculator 231 updates a reception beam weight $\underline{w}_{k+1}$ at the next point k+1 using the reception beam weight $\underline{w}_k$ calculated at the point k.

Figure 3:
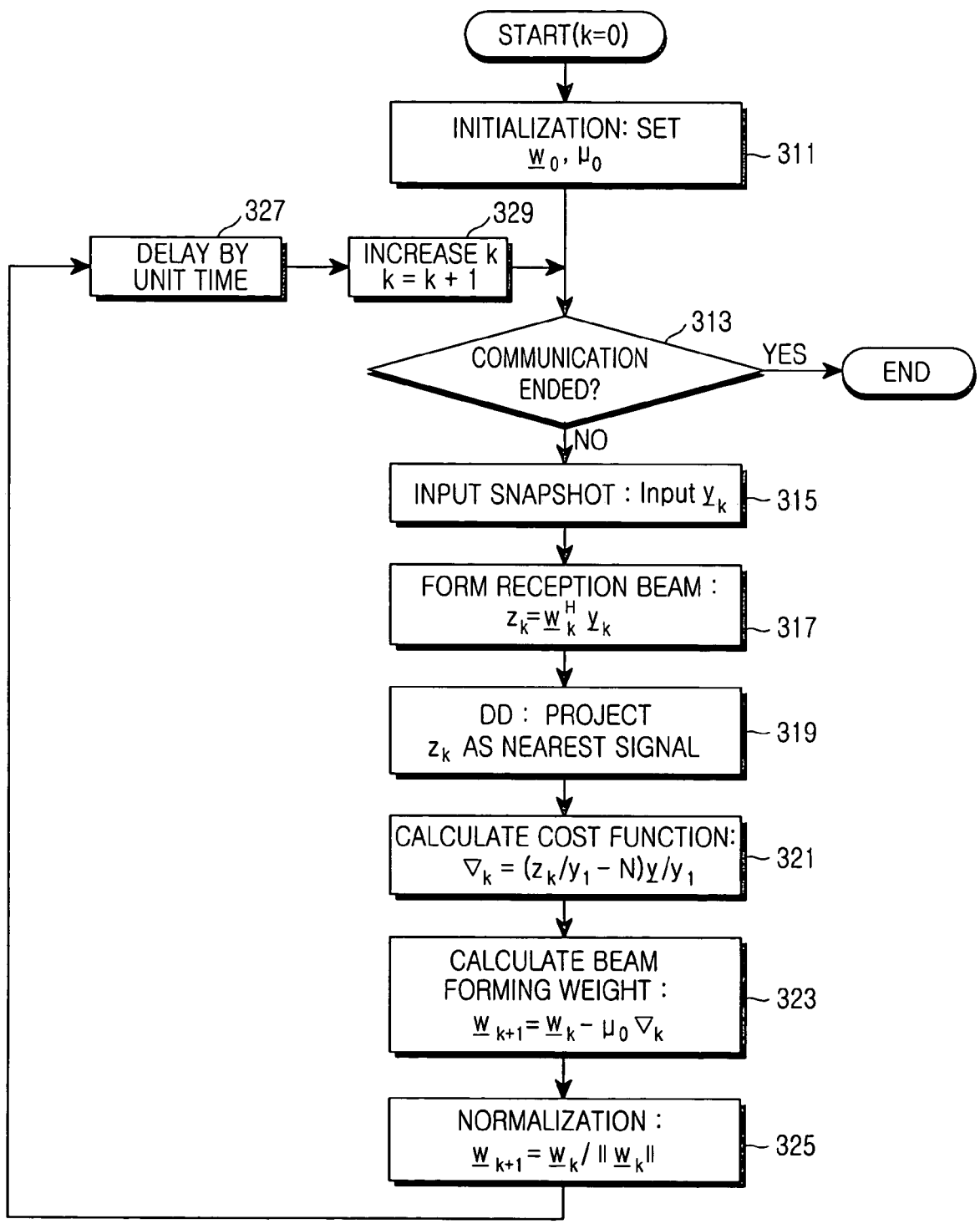
FIG. 3 is a flowchart illustrating a signal reception procedure by a base station receiver according to an embodiment of the present invention.

FIG. 3 is a flowchart illustrating a signal reception procedure by a base station receiver according to an embodiment of the present invention. In step 311, a base station receiver sets up an initial reception beam weight $\underline{w}_0$ and an initial constant gain $\mu$, and then proceeds to step 313. In step 313, the base station receiver determines if communication is ended. If it is determined that the communication is ended, the base station receiver ends the ongoing procedure.

However, if it is determined in step 313 that the communication has not ended, the base station receiver proceeds to step 315. In step 315, the base station receiver receives a despread signal $\underline{y}_k$ for the reception signal $\underline{x}_k$, and then proceeds to step 317. In step 317, the base station receiver calculates a set $\underline{z}_k$ of signals $z_k$ output from respective fingers of the base station receiver using the despread signal $\underline{y}_k$ and a reception beam weight $\underline{w}_k$ ($\underline{z}_k = \underline{w}_k^H \underline{y}_k$), and then proceeds to step 319.

The $\underline{z}_k$ represents a set of finger output signals generated using a reception beam generated using the reception beam weight $\underline{w}_k$. In step 319, the base station receiver projects the set $\underline{z}_k$ of finger output signals generated using a reception beam as the nearest signal.

Thereafter, in step 321, the base station receiver calculates a cost function J and a differentiated value $\nabla_k$ of the cost function J using the despread signal $\underline{y}_k$ in the above-stated method. Finally, in step 323, the base station receiver calculates a beam generation coefficient, or a reception beam weight $\underline{w}_k$, based on the differentiated value $\nabla_k$, and then proceeds to step 325. In step 325, the base station receiver normalizes the reception beam weight. The base station receiver then proceeds to step 327 while maintaining the current reception beam weight $\underline{w}_k$ calculated in step 325.

In step 327, the base station receiver delays by a predetermined unit time, and then proceeds to step 329. The reason for delaying by the predetermined unit time is to consider a state transition delay time. In step 329, the base station receiver increases the k by 1, i.e. transitions from the current point k to the next point k+1, and then returns to step 313. In step 313, the base station receiver determines if the communication has ended. If it is determined that the communication is ended, the base station receiver ends the ongoing procedure.

It can be appreciated that the number of calculations necessary when using simplified gradient method according to the present invention is much smaller than the number, $O(4N^2+12)$, of calculations needed in the general Max SNR.

It can be understood from FIG. 3 that the total number of calculations in the reception beam calculation process according to the embodiment of the present invention is $O(5N)$. That is, the total number, 5N, of calculations becomes the sum of the number, N, of calculations in the reception beam forming process of step 317, the number, 2N, of calculations in the beam forming coefficient calculation process of step 321, the number, 0.5N, of calculations in the beam forming weight calculation process of step 323, and the number, 1.5N, of calculations in the normalization process of step 325. Here, 'O' means 'order', and a value N means one complex calculation. For each complex calculation, calculation for a real part or an imaginary part is performed four times.

Therefore, it can be noted that as the value N increases, a difference in number of calculations between the present invention and the prior art increases remarkably.

Now, a performance comparison between the present invention and the prior art will be made with reference to FIGS. 4 and 5.

Figure 4:
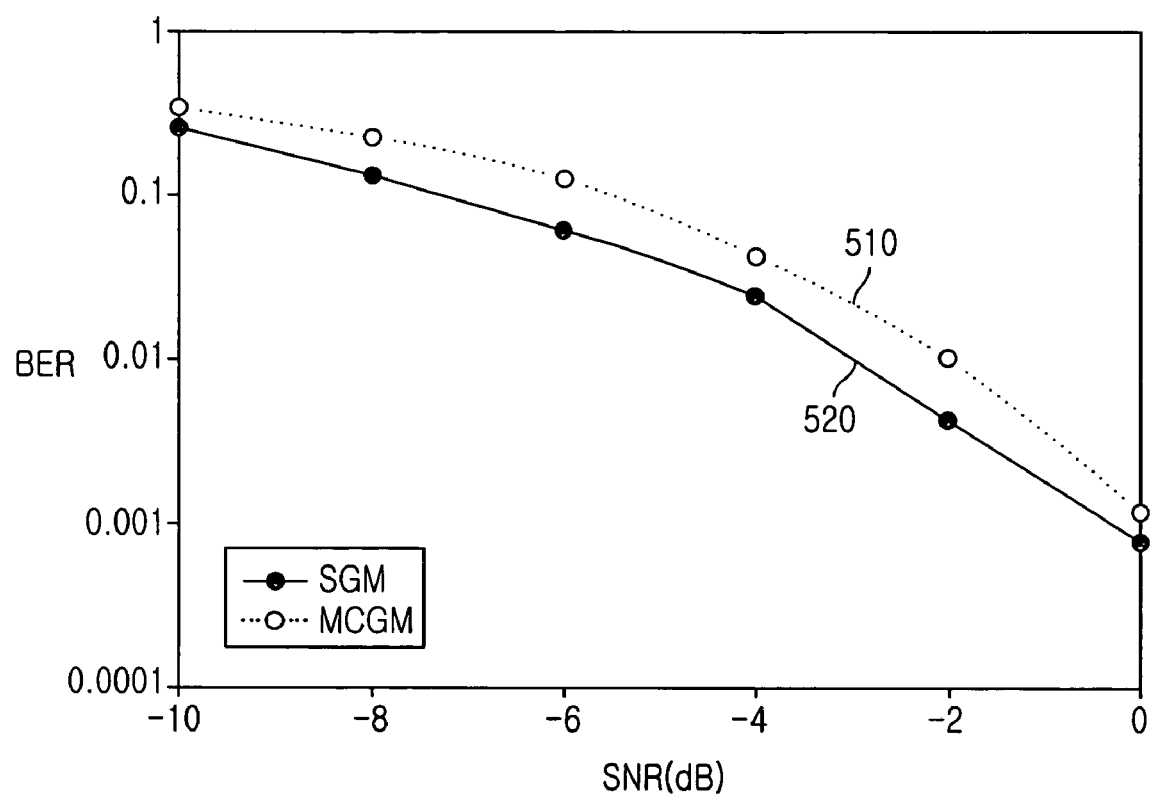
FIG. 4 is a graph illustrating a simulation result on SNR in a weight vector calculation technique according to an embodiment of the present invention.

FIG. 4 is a graph illustrating a characteristic of a signal-to-noise ratio (SNR) versus a bit error rate (BER) in an additive white Gaussian noise (AWGN) environment. It is assumed that the number of antennas is 10 and a processing gain is 64. Reference numeral 520 (SGM) represents a simulation result according to an embodiment of the present invention, and reference numeral 510 (Max SNR) represents a simulation result according to the prior art. It can be understood that the simplified gradient method (SGM) according to the present invention is superior in performance to the Max SNR according to the prior art.

Figure 5:
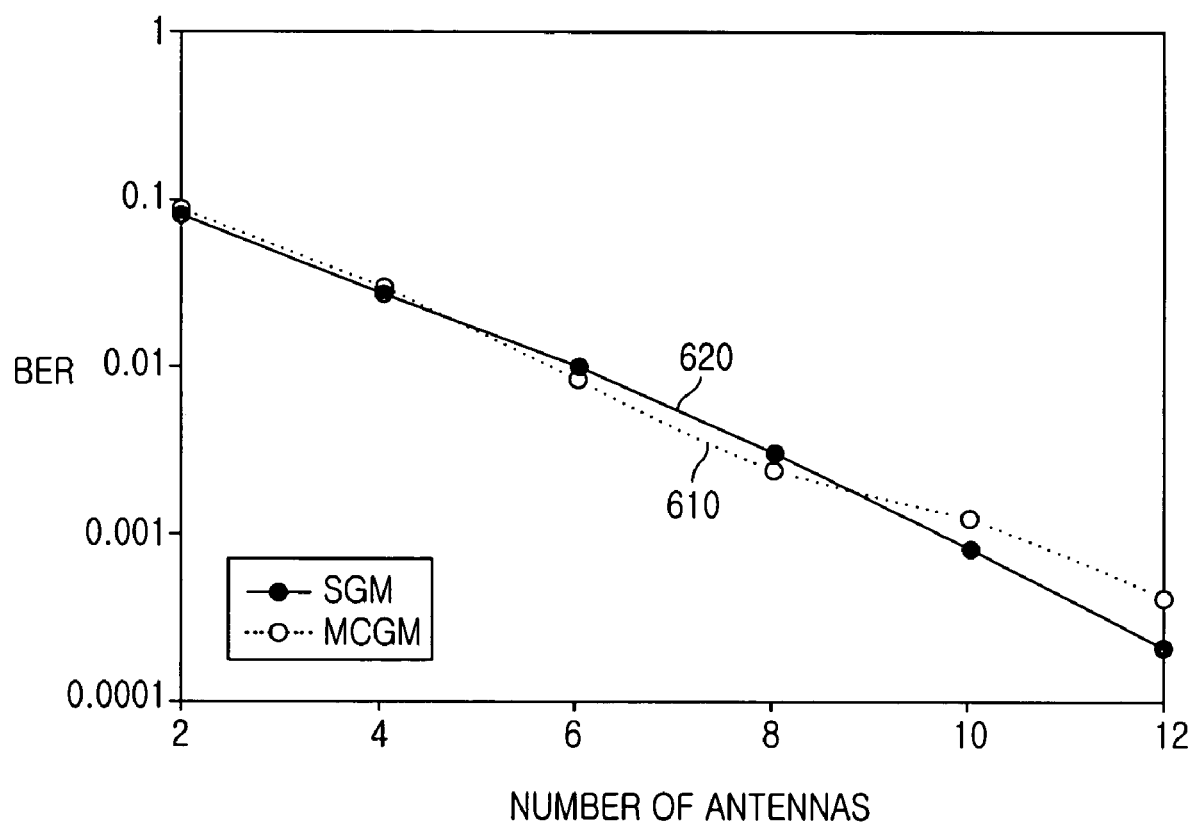
FIG. 5 is a graph illustrating a simulation result depending on a change in number of antennas in a weight vector calculation technique according to an embodiment of the present invention.

FIG. 5 is a graph illustrating a BER characteristic with respect to the number of reception antennas for SNR=0 dB. In this case, the simplified gradient method (SGM) according to the present invention is similar or slightly superior in performance to the Max SNR according to the prior art. However, because the simplified gradient method according to the present invention is remarkably smaller than the conventional Max SNR in number of calculations, the simplified gradient method is superior in implementation to the conventional technique.

As can be understood from the foregoing description, a reception beam weight is generated using a plurality of antenna elements in the simplified gradient method proposed by the present invention. By doing so, it is possible to reduce the number of calculations for generating a reception beam, thereby securing a new algorithm which is less complicated then and superior in performance than the existing algorithm.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving a signal from a radio unit in a base station having at least one reception antenna, the method comprising the steps of:

receiving a reception signal via the reception antenna, and generating an output signal using the reception signal and a reception beam weight for a previous time;

calculating a cost function using a desired reception signal transmitted from the radio unit among the reception signal and the generated output signal;

calculating a trace vector by differentiating the calculated cost function using the calculated cost function and the reception signal;

updating the reception beam weight using the trace vector for a next time; and generating a reception beam by applying the updated reception beam weight, wherein the cost function is expressed as $$J=(z/y_1-N)^2$$

where 'z' denotes a reception beam signal in which a reception beam weight is reflected, $y_1$ denotes the desired reception signal transmitted from a mobile station, and 'N' denotes a constant.

2. The method of claim 1, wherein the step of updating a reception beam weight further comprises the step of:

normalizing the calculated reception beam weight.

3. The method of claim 1, wherein the trace vector is expressed as $$\nabla_k = \frac{\partial J}{\partial \underline{w}} = (z/y_1 - N)\underline{y}/y_1$$

where 'z' denotes a reception beam signal in which a reception beam weight is reflected, '$\underline{y}$' denotes a reception signal, $y_1$ denotes the desired reception signal transmitted from a mobile station, and 'N' denotes a constant.

4. The method of claim 1, wherein the step of updating the reception beam weight comprises the step of updating the reception beam weight using the vector and the previous reception beam weight.

5. The method of claim 1, wherein the cost function is formed by a simplified gradient method that does not consider a noise signal and an interference signal among the reception signal.

6. An apparatus for receiving a signal from a radio unit in a base station having at least one reception antenna, the apparatus comprising:

a signal processor for receiving a reception signal via the reception antenna, calculating a cost function using a desired reception signal transmitted from the radio unit among the received signal and an output signal generated by a previous reception beam weight, and calculating a reception beam weight using the cost function; and a reception beam generator for generating a reception beam using the reception signal and the calculated reception beam weight, wherein the signal processor comprises:

a trace vector calculator for calculating a trace vector by differentiating the calculated cost function;

a weight calculator for updating a reception beam weight using the trace vector for a next time; and a memory for buffering the calculated reception beam weight, and inputting a reception beam weight for a previous time to the weight calculator during calculation for a next time to reflect the reception beam weight for calculation of a next reception beam weight.

7. The apparatus of claim 6, wherein the cost function is expressed as $$J=(z/y_1-N)^2$$

where 'z' denotes a reception beam signal in which a reception beam weight is reflected, $y_1$ denotes a desired reception signal transmitted from a mobile station, and 'N' denotes a constant.

8. The apparatus of claim 6, wherein the trace vector is expressed as $$\nabla_k = \frac{\partial J}{\partial \underline{w}} = (z/y_1 - N)\underline{y}/y_1$$

where 'z' denotes a reception beam signal in which a reception beam weight is reflected, '$\underline{y}$' denotes a reception signal, $y_1$ denotes a desired reception signal transmitted from a mobile station, and 'N' denotes a constant.

9. The apparatus of claim 6, wherein the cost function is formed by a simplified gradient method that does not consider a noise signal and an interference signal among the reception signal.

10. A method for receiving a signal from a radio unit in a base station having at least one reception antenna, the method comprising the steps of:
despreading a reception signal received at the base station, and outputting the despread signal;
generating an output signal of fingers using the despread signal and a reception beam weight for a previous time;
calculating a cost function using a desired reception signal transmitted from the radio unit among the received signal and the generated output signal of the fingers;
calculating a trace vector using the calculated cost function and the despread signal;
updating the reception beam weight using the trace vector for a next time; and
generating a reception beam by applying the updated reception beam weight.

11. The method of claim 10, wherein the step of calculating a trace vector comprises the steps of:
calculating a trace vector by differentiating the calculated cost function.

12. The method of claim 10, further comprising the step of normalizing the updated reception beam weight.

13. The method of claim 10, wherein the cost function is expressed as $$J=(z/y_1-N)^2$$

where 'z' denotes a reception beam signal in which a reception beam weight is reflected, $y_1$ denotes the desired reception signal transmitted from a mobile station, and 'N' denotes a constant.

14. The method of claim 10, wherein the trace vector is expressed as $$\nabla_k = \frac{\partial J}{\partial \underline{w}} = (z/y_1 - N)\underline{y}/y_1$$

where 'z' denotes a reception beam signal in which a reception beam weight is reflected, '$\underline{y}$' denotes a reception signal, $y_1$ denotes the desired reception signal transmitted from a mobile station, and 'N' denotes a constant.

15. The method of claim 10, wherein the step of updating the reception beam weight comprises the step of updating the reception beam weight using the trace vector and the previous reception beam weight.

16. The method of claim 10, wherein the cost function is formed by a simplified gradient method that does not consider a noise signal and an interference signal among the reception signal.

17. An apparatus for receiving a signal from a radio unit in a base station having at least one antenna, the apparatus comprising:
a despreader for receiving a signal, and generating a despread signal by despreading the received signal;
a signal processor for calculating a cost function using a desired reception signal transmitted from the radio unit among the received signal and an output signal generated by a previous reception beam weight, and calculating a reception beam weight using the cost function; and
a reception beam generator for generating a reception beam using the despread signal and the calculated reception beam weight,
wherein the signal processor comprises:
a trace vector calculator for calculating a trace vector by differentiating the calculated cost function;
a weight calculator for updating a reception beam weight using the trace vector for a next time; and
a memory for buffering the calculated reception beam weight, and inputting a reception beam weight for a previous time to the weight calculator during calculation for a next time to reflect the reception beam weight for calculation of a next reception beam weight.

18. The apparatus of claim 17, wherein the cost function is expressed as $$J=(z/y_1-N)^2$$

where 'z' denotes a reception beam signal in which a reception beam weight is reflected, $y_1$ denotes a desired reception signal transmitted from a mobile station, and 'N' denotes a constant.

19. The apparatus of claim 17, wherein the trace vector is expressed as $$\nabla_k = \frac{\partial J}{\partial \underline{w}} = (z/y_1 - N)\underline{y}/y_1$$

where 'z' denotes a reception beam signal in which a reception beam weight is reflected, 'y' denotes a reception signal, $y_1$ denotes a desired reception signal transmitted from a mobile station, and 'N' denotes a constant.

20. The apparatus of claim 17, wherein the cost function is formed by a simplified gradient method that does not consider a noise signal and an interference signal among the reception signal.

21. A method for calculating a reception beam weight for a radio unit capable of reducing the number of calculations in a base station that has at least one reception antenna, generating a reception beam of the reception antenna using a previous reception beam weight and receiving a signal for a current reception signal, generating an output signal using the received signal by applying the generated reception beam, and calculating a current reception beam weight using the output signal, the method comprising the steps of:
generating a cost function by applying the generated output signal and a desired reception signal transmitted from the radio unit among the received signal; and
calculating a reception beam weight for a current time by performing predetermined calculation using the received signal, the generated cost function, and the previous reception beam weight, wherein the step of calculating a reception beam weight comprises the steps of:

calculating a trace vector by differentiating the calculated cost function; and updating a reception beam weight using the trace vector and the previous reception beam weight for a next time, wherein the cost function is expressed as $$J=(z/y_1-N)^2$$

where 'z' denotes a reception beam signal in which a reception beam weight is reflected, $y_1$ denotes the desired reception signal transmitted from a mobile station, and 'N' denotes a constant.

22. The method of claim 21, further comprising the step of normalizing the updated reception beam weight.

23. The method of claim 21, wherein the trace vector is expressed as $$\nabla_k = \frac{\partial J}{\partial \underline{w}} = (z/y_1 - N)\underline{y}/y_1$$

where 'z' denotes a reception beam signal in which a reception beam weight is reflected, '$\underline{y}$' denotes the reception signal, $y_1$ denotes a desired reception signal transmitted from a mobile station, and 'N' denotes a constant.

24. The method of claim 21, wherein the cost function is formed by a simplified gradient method that does not consider a noise signal and an interference signal among the reception signal.

* * * * *